UNITED STATES PATENT OFFICE.

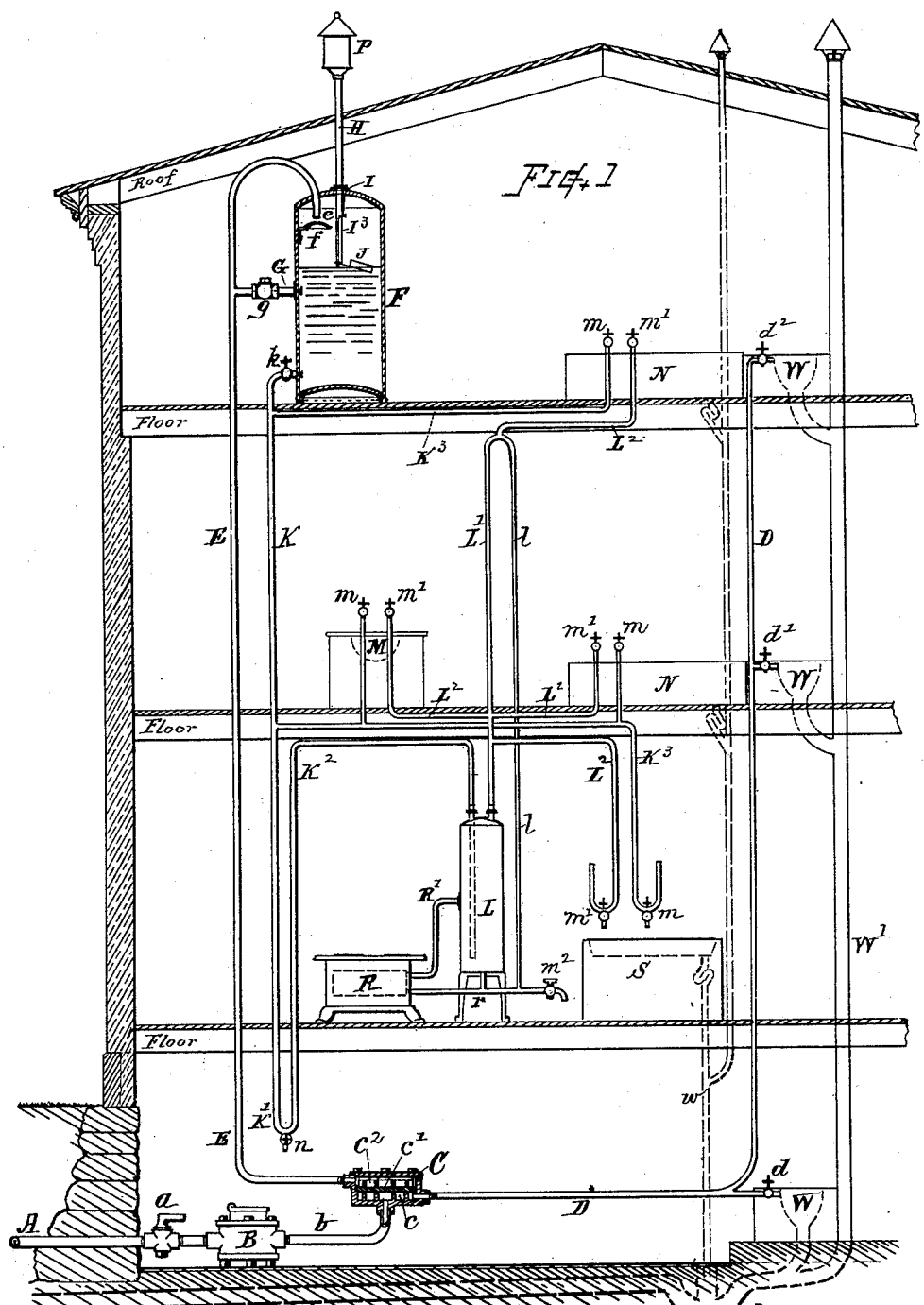

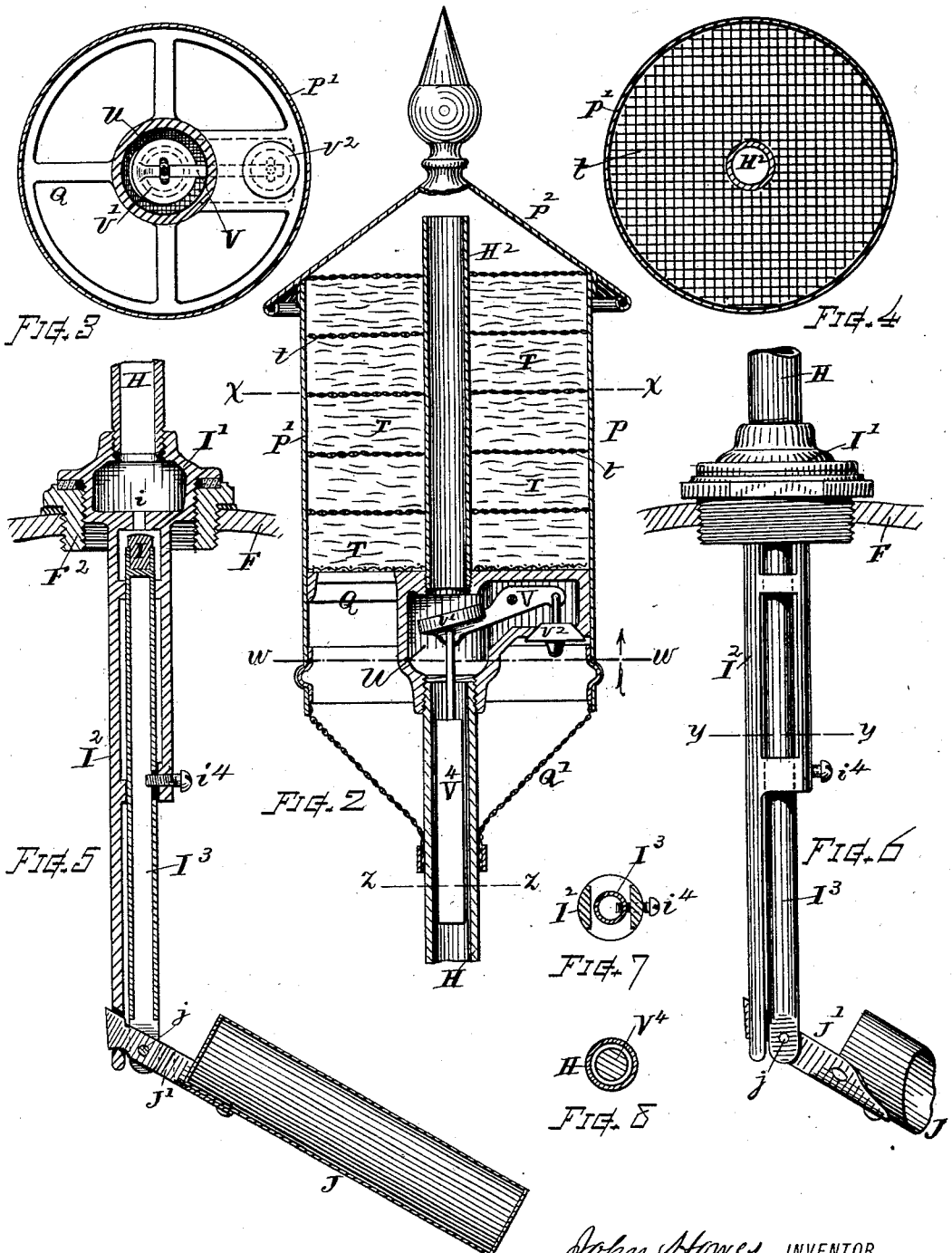

JOHN HOWES, OF WORCESTER, MASSACHUSETTS.

WATER-SERVICE SYSTEM AND APPLIANCE FOR BUILDINGS.

SPECIFICATION forming part of Letters Patent No. 360,697, dated April 5, 1887.

Application filed August 20, 1885. Serial No. 174,863. (No model.)

*To all whom it may concern:*

Be it known that I, JOHN HOWES, a citizen of the United States, residing at Worcester, in the county of Worcester and State of Massachusetts, have invented certain new and useful Improvements in Water-Service Systems and Appliances for Buildings, &c.; and I declare the following to be a description of my said invention sufficiently full, clear, and exact to enable others skilled in the art to which it appertains to make and use the same, reference being had to the accompanying drawings, which form a part of this specification.

My present invention relates to improvements in the system of water service and appliances therefor, whereby a supply of filtered water can be furnished for distribution, stored, and maintained in a condition to avoid contamination by noxious gases, dust, or vermin, and in a manner to give efficiency of service under light head-pressure or intermittent supply, as well as under heavy pressure or head and constant supply.

The particular features and subject-matter of invention claimed are illustrated in the drawings, and hereinafter definitely specified.

Figure 1 is an elevation diagram illustrating my improved system of water service as adapted for dwellings and other buildings. Fig. 2 is a vertical sectional view of the air-filter for purifying the air before it enters the accumulating-reservoir. Fig. 3 is a section of the air-filter at line $w\ w$, Fig. 2, looking upward, as indicated by arrow. Fig. 4 is a section of the air-filter at line $x\ x$ on Fig. 2. Fig. 5 is a vertical section of the stop-valve and float at the top of the accumulator reservoir or tank. Fig. 6 is a side view of the same. Fig. 7 is a transverse section of the rods at line $y\ y$ on Fig. 6; and Fig. 8 is a transverse section of the pipe and guard-float at line $z\ z$, Fig. 2.

It will be observed that the various parts of the apparatus, as shown in Fig. 1, are not drawn to a regular or proportional scale, some of the parts being diminished and others exaggerated from actual proportionally-reduced dimensions, in order to clearly illustrate the system and include the diagram within the prescribed limits of space of the drawing-sheet. It will, however, be understood that in practice the parts and various appliances may be proportioned and located relatively as best suited for carrying out the system under the particular conditions and requirements of the building, place, or service where employed without departing from the nature and spirit of the invention as herein described and claimed.

In referring to parts, A denotes the supply-pipe from the street-main, and $a$ the stop-cock for letting on and shutting off the water.

B indicates the meter, which may be of any well-known kind, as preferred.

C denotes a filtering apparatus, (shown in sub-section,) which is preferably constructed substantially as shown and described in my former Letters Patent, No. 322,722, or either of my other Letters Patent, Nos. 236,496, 276,820, 280,828, or later application, (Serial No. 172,600,) although other suitable automatically-cleansable filtering apparatus might be employed, if desired. The pipe $b$ connects the meter and filter.

D indicates a pipe for dirty or unfiltered water, leading to one or more water-closets, W, or to other places of use where it is of no consequence that the water should be filtered. The draft-cocks for unfiltered water are indicated at $d\ d'\ d^2$. The pipe D communicates with the outer end of a spiral or serpentine channel, $c$, on the under surface of the filter material or plate $c'$, while the pipe $b$ communicates with the center or inner end of said channel $c$; hence the water can flow direct from the head or meter B to the cocks $d\ d'\ d^2$ without passing through the filter-plate $c'$, but must flow along the surface of said filter-plate, upon which the sediment is deposited, while passing through the channel or sediment-chamber of the filter.

E denotes the stand-pipe, or a pipe leading from the chamber $c^2$, above the filter-plate $c'$, up to a tank, receiver, or storage-reservoir, F, located in the upper part of the building. The top end of pipe E enters the top of the tank F, and its exit end or nozzle $e$ delivers the water upon a deflector-plate, $f$, within the tank, or in a manner that will give a spray or sprinkling action through the air contained in the upper part of said tank. A short cross passage or pipe, G, communicates from the pipe E to the side of the tank at some distance from its bottom, but below the nominal water-level, and said cross-passage is fitted with a check-valve, $g$, which opens with flow of water from the tank to pipe E, for a purpose hereinafter explained, and closes to prevent water flowing from the pipe to the tank, so that the water is compelled to enter the tank by way of top end or nozzle, $e$.

The tank F, which serves as an accumulator and temporary storage-reservoir, is made as a close air-tight chamber or receiver consisting of a metal cylinder without openings, except such as are required for the connection of the several pipes, which are each screwed in or otherwise connected in a manner to insure air and water tight joints. The capacity of the tank may be made to correspond with the requirements of service. If the supply is intermittent or under light head-pressure, or there is much water to be used, then it would be desirable that the tank be of greater proportional capacity than it would be if the supply is constant or under heavy head-pressure, or if but a small quantity of water is to be used, other conditions being substantially similar.

In the top of the tank is arranged an air-inlet having a pipe, H, which extends above the roof of the building, or to a position accessible to fresh air. Said inlet is fitted with an inwardly-opening stop-valve, I, automatically operated by the rise and fall of the water-level within the tank, preferably by means of a float and connections adapted for exerting the required force for securely stopping the passage $i$ and preventing escape of air, so that rise of water within the tank after the valve has closed will tend to compress the confined air and accumulate pressure within the tank.

A convenient and efficient method of arranging this valve and its actuating devices is shown in Figs. 5 and 6, wherein I' indicates the stopper fitted to the top opening in the tank, (with or without bushing $F^2$,) and carrying a dependent guide-standard, $I^2$, for the valve-rod $I^3$, which is retained therein by a screw, $i^4$; and J indicates the float, the arm J' of which is fulcrumed to the standard $I^2$ and pivoted to the valve-rod, as at $j$, for operating it as the float rises and falls.

K indicates the distributing or service pipe, leading from the lower part of the tank F and descending to a point, K', below the level of the hot-water boiler L, and from thence having a branch, $K^2$, leading upward and into said boiler L for supplying water to the same. The branch pipes $K^3$, for delivering or serving the cold water at wash-basins M, baths N, and sinks S, connect with the pipe K. The various faucets for the filtered-cold-water service are indicated at $m$.

The boiler L is connected with a water back or coil in the kitchen range or heater R by pipes R' and $r$, to effect the heating of water in the boiler in the usual manner. L' is the hot-water stand-pipe, with branches $L^2$ for delivering or serving hot water at wash-basins M, baths N, and sinks S. The various faucets for the filtered-hot-water service are indicated at $m'$.

From the top of pipe L' a pipe, $l$, of smaller caliber leads downward and connects with the bottom of boiler or pipe $r$, connected therewith, to give circulation for the hot-water service. The water cooling in the small pipe settles, causing a down current therein and an upward current in pipe L'.

W' indicates the soil-pipe of the water-closet; W $w$, the waste-pipe of the baths and sink, and S' the sewer-pipe, the two latter being indicated by dotted lines. These several pipes for the waste-discharge may be arranged in the usual or any suitable manner.

I prefer to place a stop-cock, $k$, in pipe K for shutting off the service to facilitate repairs, and also a cock at $n$ for draining the pipes. A bib-cock, $m^2$, may also be arranged on pipe $l$ or $r$ for drawing from the hot service. Either or all of these cocks may be omitted, if desired.

At the top of the pipe H, which extends above the roof or to the exterior of the building and conducts air to the interior of the tank F, I arrange an air filter or purifier, P, for preventing the entrance of dust or vermin to the pipe H. Said air-filter I prefer to construct in the manner illustrated in Figs. 2, 3, and 4—that is, with a metal cylinder, P', closed at its upper end by a cap, $P^2$, to shed rain, and open at its lower end to admit air through a protecting-grating, Q', the interior thereof being filled with a fibrous substance, as at T, with or without wire-nettings $t$, and through which the air passes on its way to the pipe H, which may extend into the top of the casing, as at $H^2$. The air is thus purified from dust and vermin before it is brought in contact with the water in the tank, and said water is thoroughly filtered before it enters the tank, and the tank being close, the contents are not subject to contamination by noxious gases generated within the building, and which rise to the upper stories, chamber, or attic where the tank is located.

The lower part of the air-filter is preferably provided with an automatic guard-valve mechanism, V $v'$, to prevent the forcing of water up into the fibrous packing in case the stop-valve I should from any cause fail to work.

In the operation of my improved system the water entering at A is measured by the meter B, and is filtered at C. It passes up into the tank F, and is aerated by falling in spray therein. As the water rises in the tank the valve I is closed, and the air in the upper part of the tank becomes compressed and condensed until the accumulated force is sufficient to counteract the head-pressure and stop the flow through the pipe A. This degree of pressure may in some cases be sufficient to carry the water in the service or distributing pipes to a much higher level than the location of the tank, according as the head-pressure exceeds that due to the height of the tank.

When one of the cocks $d$, $d'$, or $d^2$ is opened, the expansion of air in the tank causes a reverse flow through the passage G, pipe E, and filter-plate $c'$, which, in addition to the current passing from pipe $b$ to pipe D through the chamber or channel $c$, effects the automatic cleansing of the filter without other attention than the ordinary use of the appliances.

The pipe G and check-valve $g$ being at intermediate height of the tank, it will be seen that the water in the tank cannot be lowered by use of the water-closets beyond a certain limit, thus leaving an ample amount for the supply of the boiler L, and as soon as the pressure within the tank or accumulator is reduced below that of the supply the water again commences to flow into the tank. Whenever the water in the tank falls below a minimum level, the valve I is opened by the dropping of float J, and air is drawn into the tank through the air-filter P and pipe H, thus keeping the quantity of air in the tank replenished with air from the outer space purified and freed from dust by its passage through the air-filtering material, while all insects and vermin or noxious gases are excluded from the tank by reason of its close construction and the two filters which guard the passages leading thereto.

What I claim as of my invention, and desire to secure by Letters Patent, is—

1. The combination, with supply and distribution pipes in a water-service system, of a water-filtering apparatus connected in said supply, a close storage-tank for receiving the filtered water, an air-filtering appliance, P, located externally of the building and connected by a pipe with said tank, and means, substantially as described, for preventing flowage from the tank through said air-filter.

2. The combination, with supply and distribution pipes in a water-service system, of a water-filter in the supply, an aerating-compartment for contact of the water with air, located between said filter and the point of distribution, and an air-filter in connection with said compartment for purifying air that enters said compartment, substantially as set forth.

3. The combination, with supply and distribution pipes in a water-service system, of a water-filtering apparatus connected in the supply, a close tank provided with an automatically-actuated air-valve for confining air within said tank, the air-filter connected with an air-pipe leading into said tank and controlled by said valve, a pipe for conducting filtered water from said filter into the top of said tank, and means for separating the water into a spray as it is delivered through the confined air within said tank, substantially as and for the purpose set forth.

4. A water-service system consisting of the filtering apparatus C, connected with the main supply-pipe, the close storage-tank F, having an air-inlet, the valve I, and the float J, for automatically closing said inlet to effect compression of air within said tank, a pipe, E, leading from the filtrate-chamber of said filtering apparatus into the top of said tank, with a cross-passage, G, between said pipe and tank, provided with an outwardly-opening check-valve, the pipe D, leading from the sediment-chamber of said filter to the water-closet W, and the distributing-pipe K, substantially as and for the purposes hereinbefore set forth.

5. A water-service system consisting of the filtering apparatus C, connected with the main supply-pipe, the close storage-tank F, having an air-inlet, the automatically-operating valve I, for closing said inlet to induce pressure of air within said tank, an air-filter connected by a pipe, H, with said air-inlet, the pipe E, leading from the filtrate-chamber of said filtering apparatus into the top of said tank, means for breaking the water entering said tank into a spray, the cross-passage G between said pipe and the side of the tank, provided with an outwardly-opening check-valve, $g$, a pipe, D, leading from the sediment-chamber to the water-closet W, and the distributing-pipe K and branches, substantially as and for the purposes hereinbefore set forth.

Witness my hand this 17th day of August, A. D. 1885.

JOHN HOWES.

Witnesses:
CHAS. H. BURLEIGH,
CHARLES S. BACON.